United States Patent [19]

Heilmayr et al.

[11] Patent Number: 4,911,628
[45] Date of Patent: Mar. 27, 1990

[54] TRIWALL SIDING APPARATUS

[75] Inventors: Peter Heilmayr, McPherson; Kenton Gearhart, Moundridge; Cliff Hawkes, McPherson, all of Kans.

[73] Assignee: American Maplan Corporation, McPherson, Kans.

[21] Appl. No.: 254,385

[22] Filed: Oct. 5, 1988

[51] Int. Cl.⁴ .............................................. B29C 47/06
[52] U.S. Cl. ................................ 425/131.1; 264/45.9; 264/171; 425/133.5; 425/462; 425/817 C
[58] Field of Search ................ 264/171, 177.1, 177.16, 264/45.9; 425/131.1, 4 C, 133.5, 817 C

[56] References Cited

U.S. PATENT DOCUMENTS

| | | | |
|---|---|---|---|
| 3,189,941 | 6/1965 | Reifenhauser | 425/133.1 |
| 3,331,900 | 7/1967 | Thomas | 425/817 C |
| 3,411,981 | 11/1968 | Thomas | 264/45.9 |
| 3,825,644 | 7/1974 | Hoagland et al. | 264/171 |
| 3,833,704 | 9/1974 | Nissel | 264/171 |
| 3,860,372 | 1/1975 | Newman, Jr. | 425/133.1 |
| 4,107,247 | 8/1978 | Dukess | 264/45.9 |
| 4,187,270 | 2/1980 | Bartrum | 264/177.16 |
| 4,221,624 | 9/1980 | Eslinger et al. | 264/45.9 |
| 4,405,547 | 9/1983 | Koch et al. | 264/176.1 |

FOREIGN PATENT DOCUMENTS

| | | | |
|---|---|---|---|
| 55-46950 | 4/1980 | Japan | 425/133.5 |
| 61-241121 | 10/1986 | Japan | 425/133.5 |
| 61-241122 | 10/1986 | Japan | 425/133.5 |
| 62-183224 | 6/1987 | Japan | 425/131.1 |

Primary Examiner—Jeffery Thurlow
Attorney, Agent, or Firm—Herbert Dubno

[57] ABSTRACT

Highly uniform three-layer extrusions generally of flat siding or panels, preferably of PVC are extruded in an apparatus having a flow block in which lateral extruders supply the upper and lower layer streams to respective curved flow passages running to outlets of a flow block while a main extruder supplies the foam PVC to the central outlet. The outlets are aligned with orifices of a flow plate connected by respective channels to outlet orifices arranged within a common circle and communicating with a die. The outlet orifices include a pair of elongated kidney-shaped orifices encircling and straddling an ovoid central orifice.

5 Claims, 4 Drawing Sheets

TRIWALL SIDING APPARATUS

CROSS REFERENCE TO RELATED APPLICATION

This application is related to the commonly owned copending application Ser. No. 07/237,211 filed Aug. 26, 1988 now U.S. Pat. No. 4,856,975.

1. Field of the Invention

Our present invention relates to a siding extruder apparatus and method and, more particularly, to an apparatus and method for making siding by extrusion in such manner that the extruded siding is composed of three uniform layers, i.e. has generally a sandwich construction.

2. Background of the Invention

In the aforementioned copending application, there is described a flow plate for the fabrication of siding which comprises two layers derived from respective extruders and emerging from a flat siding die downstream of the flow plate. The particular configuration of that flow plate ensures a uniform distribution of the three synthetic resin layers adapted to form the siding.

Prior to that development, various attempts at coextrusion of rigid polyvinylchloride (PVC) objects had been made.

Basically, a respective extruder is provided for each of the PVC materials to be incorporated in the laminated, extruded structure and the flows from the respective extruders are combined at the inlet to the extrusion die in various ways.

Experience has shown, however, that conventional techniques have not been satisfactory in the coextrusion of triple layer bodies such as siding, because of the cost of the apparatus, because of the nonuniformity of the properties of the various layers and because of difficulties in handling the variety of materials which are desirable for the various layers.

Therefore, it can be said that heretofore the production of triple layer extrusions in a panel and/or siding sandwich construction, utilizing different rigid PVC compositions including filled, foamed, impact-modified and other compositions including combinations of rigid PVC with other copolymers, has not been satisfactory.

OBJECTS OF THE INVENTION

It is, therefore, the principal object of the present invention to provide an apparatus for the coextrusion of generally flat members with a triple layer or sandwich construction and in which the respective layers are uniform although continuously extruded, and wherein the apparatus is free from the drawbacks of earlier systems as described above.

It is also an object of this invention to provide an improved method of coextruding PVC and like materials, especially in three layers in which at last two layers have different compositions or properties, whereby the production cost is low, the amount of defective material produced by the process is negligible and the products made have highly uniform or constant properties over the duration of an extrusion period.

Yet another object of our invention is to provide a method of and an apparatus for triple-layer coextrusion of PVC which ensures that the layers sandwiching the intermediate layer will be of uniform thickness in the flat extruded product in spite of the fact that the three materials enter the extrusion die through a substantially circular inlet orifice.

SUMMARY OF THE INVENTION

These objects and others which will become apparent hereinafter are attained, in accordance with the present invention in an apparatus which makes use of three extruders, including a main extruder for a central synthetic resin stream, e.g. of foam polyvinylchloride, and a pair of extruders laterally connected to the flow block, preferably having axes including acute angles with the axis of the main-flow extruder and providing respective streams of synthetic resin, e.g. filled polyvinylchloride which may or may not be foamed. According to the principles of the present invention, the outlets for the three streams are provided along a common side of the flow block and communicate with inlet orifices of a flow plate disposed between the block and the die.

According to the invention, the plate can be clamped between an adapter forming the connection to the die and the flow block while the extruders are connected by respective adapters to the flow block as well.

Advantageously, the inlet orifices of the flow plate communicate wit respective outlet orifices disposed within a common circle and comprising a pair of elongated generally kidney-shaped orifices which straddle and substantially enclose an ovoid central orifice.

The advantages of this system are that the flow block, adapter and flow plate form a three-member construction which is easily machined, of simple and economical design and easily replaced and cleaned.

The product made can be siding having strong outer layers and a foamed-core layer which provides a strong, low-cost and low-weight product of high uniformity.

The middle layer thickness can range from 0.02 to 0.03 inch, for example, while the thickness of the upper and lower layers may be from 0.005 to 0.1 inch with extremely high uniformity because of the configuration of the outlet orifices of the flow plate.

Advantageously, the additional inlets of the flow block and the respective extruders may include angles of 45° to 85° with the main axis of the flow block, with the preferred angle being 70° and the flow passages connecting these lateral inlets with the respective additional outlets of the flow block having a continuous curvature with a radius range between 4.75 and 6.75 inches.

More specifically, therefore, the invention provides an apparatus for extruding a continuous generally flat siding having three uniform layers of synthetic resin material which comprises:

a flow block having a main axis and a pair of axial ends, the flow block being formed with a main-flow inlet at one of the axial ends, a main-flow outlet axially aligned with the main-flow inlet at the other of the axial ends, a pair of lateral inlets disposed on opposite sides of a median plane along the main axis and having respective inlet axes including angles between about 45° and about 85° with the plane and vertices tapering in a direction toward the other end, a pair of additional outlets at the other axial end having outlet axes parallel to the main axis and flanking the main-flow outlet, a substantially rectilinear main-flow passage extending along the main-flow axis and connecting the main-flow inlet with the main-flow outlet, and respective additional passages interconnecting each of the lateral inlets with a respective one of the additional outlets and substantially continuously curved therebetween;

respective adapters connecting each of the inlets to a respective extruder for delivering respective streams of thermoplastic synthetic resin to the passages and the respective outlets;

a positive displacement flow plate adjacent the other axial end of the flow block, the flow plate being formed on one side with a central inlet orifice registering with the main flow outlet and additional inlet orifices respectively registering with the additional outlets, the flow plate being formed on an opposite side with a central outlet orifice of generally ovoid configuration, and with additional outlet orifices of generally elongated arcuate kidney shape extending arcuately around and straddling the central outlet orifice, the flow plate being further formed with respective channels smoothly connecting each of the additional inlet orifices with a respective one of the additional outlet orifices and the central inlet orifice with the central outlet orifice; and a die having an inlet registering with all of the outlet orifices, a wide mouth from which a flat workpiece consisting of the streams in respective layers emerges, and a passage spreading from the circular inlet of the die to the mouth.

The additional outlet orifices each should have an outer margin centered on the common circle and disposed symmetrically opposite one another across this circle while the die can have an inlet which is coaxial with the common circle. The additional outlet orifices may be symmetrical with respect to a plane of symmetry including centers of the inlet orifices and the common circle.

Each of the additional outlet orifices, moreover, may have rounded ends terminating at a plane through the center of the common circle and perpendicular to the symmetry plane mentioned previously.

Another aspect of the invention is the positive-displacement flow plate which can comprise a body having a plurality of outlets for respective streams of synthetic resin material and an extrusion die, the flow plate comprising a body formed on one side with a central inlet orifice registering with one of the outlets and additional inlet orifices respectively registering with additional ones of the outlets, the body being formed on an opposite side with a central outlet orifice of generally ovoid configuration, and with additional outlet orifices of generally elongated arcuate kidney shape extending arcuately around and straddling the central outlet orifice, the body being further formed with respective channels smoothly connecting each of the additional inlet orifices with a respective one of the additional outlet orifices and the central inlet orifice with the central outlet orifice, whereby the die can communicate with the outlet orifices.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
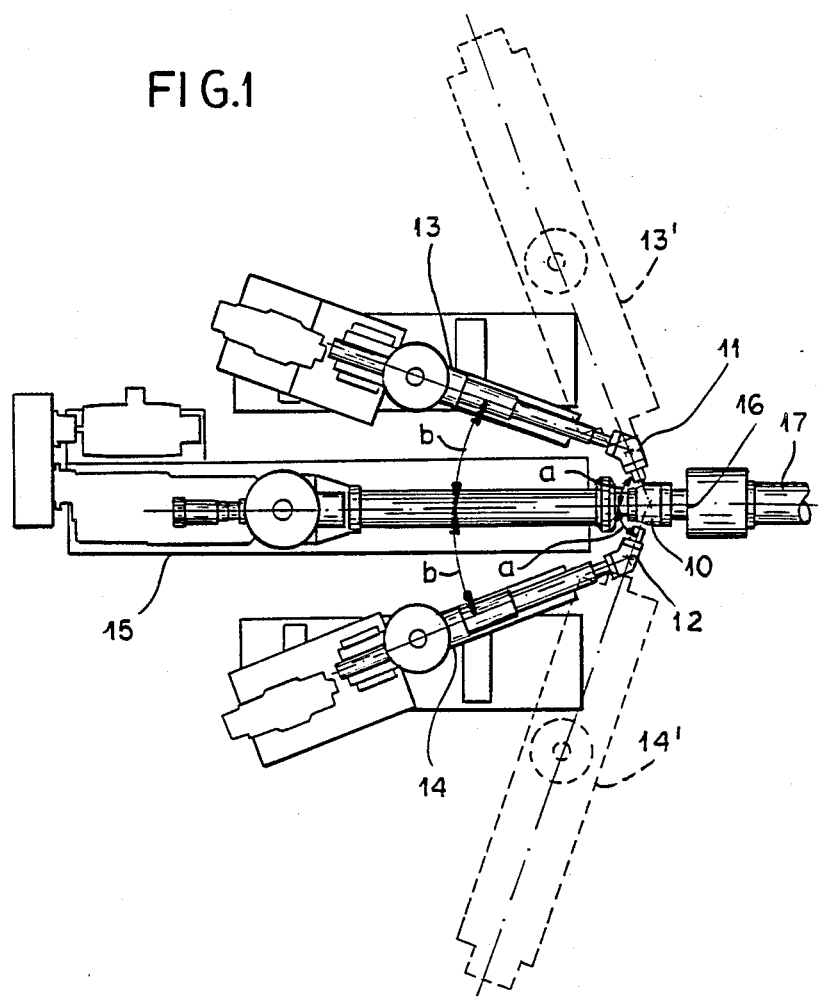
FIG. 1 is a plan view of the apparatus of the invention in highly diagrammatic form.

The basic elements of the apparatus of the invention can be seen in FIG. 1 and can comprise a flow-block assembly 10 provided with adapters 11 and 12 which can be utilized to connect extruders 13 and 14 to the flow block at lateral inlets to be described in connection with FIG. 1. The main extruder 15 supplies the central stream of foamed synthetic resin, e.g. PVC.

The flow block can have a main axis 16 and each of the adapters 11 and 12 can include angles a with this axis of about 70°.

While the extruders 13 and 14 may lie along these axes as shown in broken lines at 13' and 14', for compactness, it has been found to be advantageous to have the extruders 13 and 14 adjoin the adapters 11 and 12 at angles so that they may include angles b of say 20° with the main extruder.

The emerging siding has been represented at 17 in FIG. 1.

Figure 2:
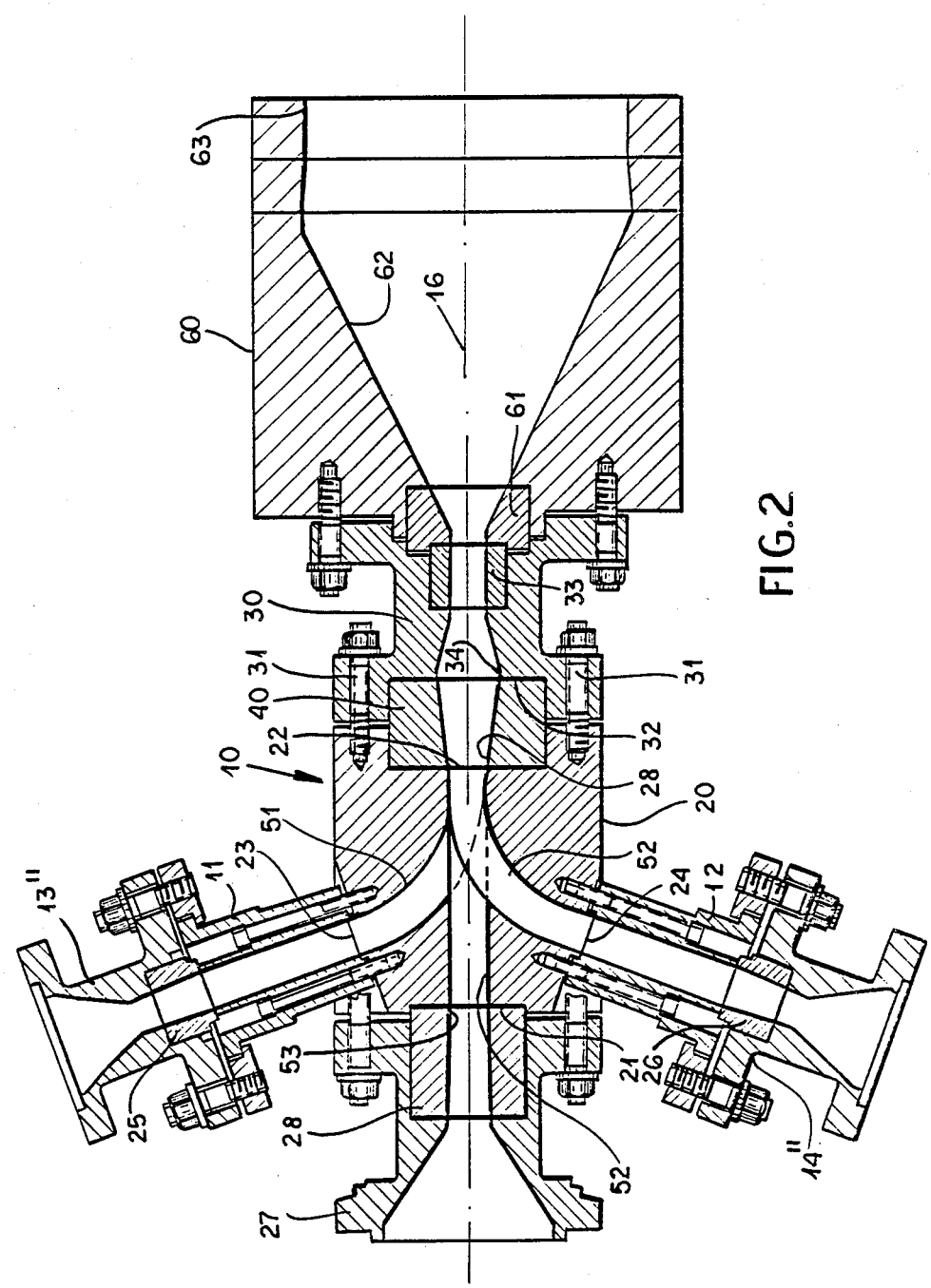
FIG. 2 is a cross-sectional view through the apparatus.

In FIG. 2 we have shown the flow-block assembly 10 in somewhat greater detail.

This assembly comprises a flow block proper represented at 20 with a main inlet 21 at one axial end and three outlets 22 at the opposite axial end, in addition to a pair of lateral inlets 23 and 24 with which the adapters 11 and 12 are connected as generally described previously. The adapters may all be of the flanged and bolted type, and are themselves conventional in the art so that they need not be described. Insert disks 25 and 26 may be provided in the various adapters for versatile connection to the respective extruders, end portions of which are shown at 13'' and 14'' in FIG. 2.

The extruder 15 may be connected by a further adapter 27 with a similar insert 28 to the upstream end of flow block 20.

The flow-block assembly 10 also comprises an adapter 30 which is bolted at 31 to the downstream end of flow block 20 and has a recess 32 registering with the recess 28 in the downstream end of the blow block 20.

Within this recess, a positive displacement flow plate 40 is provided.

Between the lateral inlets 23 and 24 and their respective outlets, curved flow passages 51 and 52 are provided, preferably with radii of curvature of substantially 4.75 to 6.75 inches.

A straight-flow passage 52 runs between the central outlet and the central inlet 53 from extruder 15.

Figure 4:
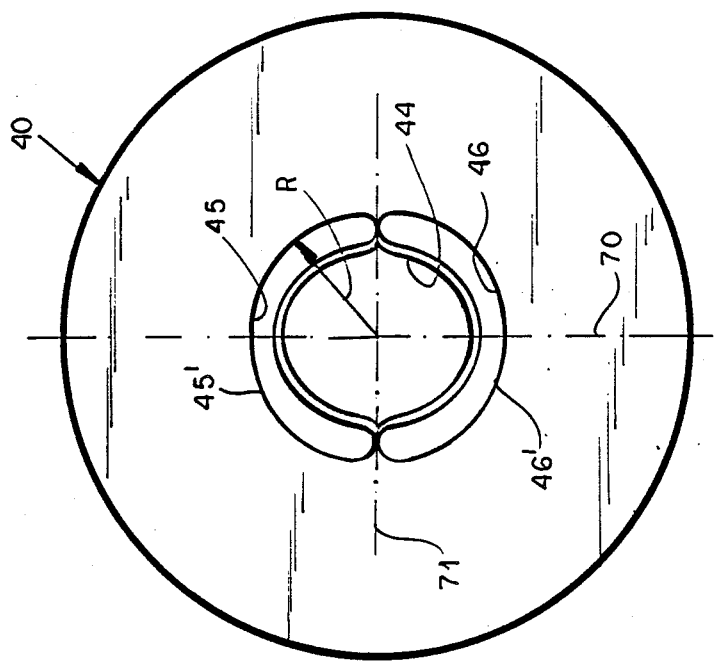
FIGS. 3 and 4 are end views of the flow plate.
Figure 3:
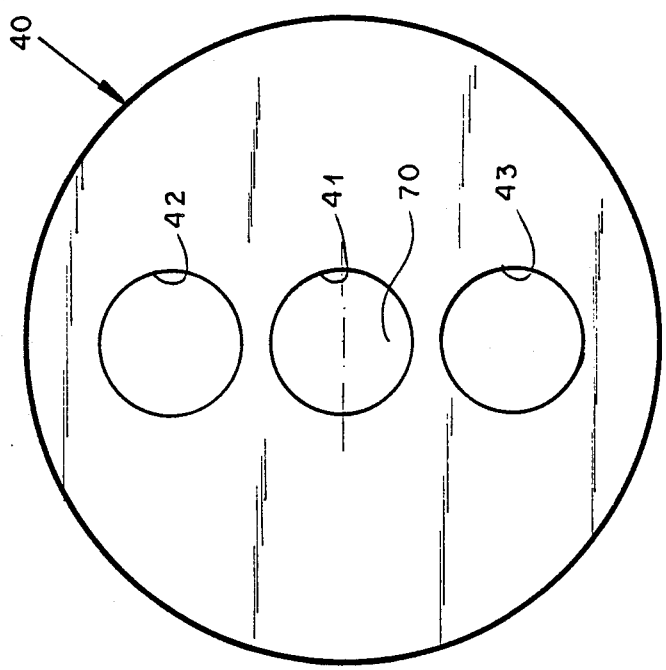
Figure 5:
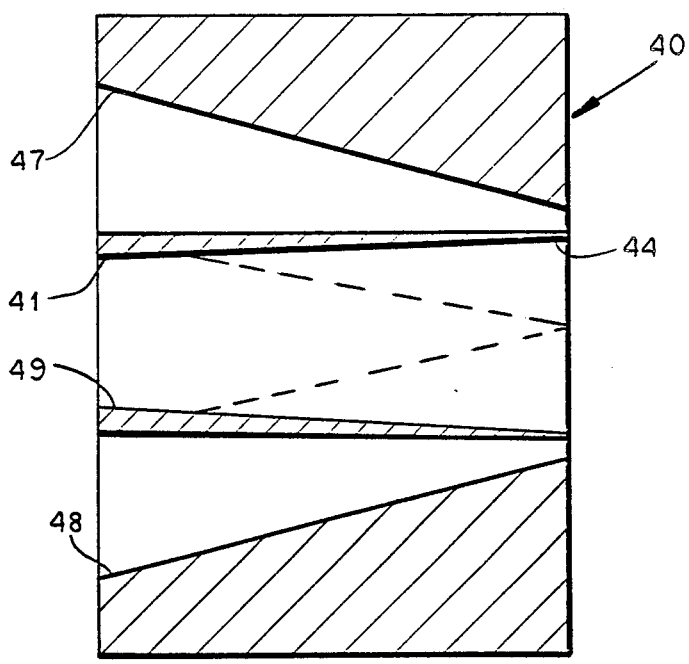
FIG. 5 is an axial section through the flow plate of the present invention.

The flow plate 40 has best been shown in FIGS. 3–5.

At its upstream side, the flow plate 40 is provided with a central inlet orifice 41 which communicates with the central outlet of passage 52 and registers therewith. A pair of additional inlet orifices 42 and 43 for the upper and lower streams of synthetic resin material register respectively with the outlets of the flow passages 52 and 51, previously described.

At the downstream end of the flow plate 40, however, the outlet orifices all are centered on a common circle having a radius R.

Thus a central outlet orifice 44 of generally ovoid configuration is provided which is straddled by a pair of elongated kidney-shaped orifices 45 and 46 whose outer margins 45' and 46', respectively, lie along the common circle of radius R, which can correspond to the circle of the inlet of the die to be subsequently described or, more precisely, the passage of the adapter 30 which can be considered to form part of the die and in any event connects the die to the flow-block assembly.

Flow passages 47 and 48, respectively, connect the inlet orifices 42 and 43 with the outlet orifices 45 and 46.

A central passage 49 connects the inlet orifice 41 with the outlet orifice 44.

Returning to FIG. 2, it can be seen that the die 60 of the apparatus can be bolted via the adapter 30 to the flow block 20, e.g. through the intermediary of insert disks 33 and 61 and is formed with a passage 62 spreading to a wide mouth 63 at which the extruded siding emerges in its three-layer form. The inlet to the die, e.g. the inlet 34 defined by the adapter 30 may be circular and will have a radius R as previously described and be aligned along the axis 16.

It has been found to be advantageous for the extrusion of PVC siding of the type described that the area of each of the outlet orifices 45 and 46 should make up about 15 to 25% of the total flow cross section entering the orifice 34 while the central orifice 44 should make up approximately the balance. In a preferred embodiment, the area of the central orifice is about 61.9% while the areas of the orifices 45 and 46 are about 19% each.

In operation, of course, the foamed polyvinylchloride is fed by the main extruder 15 through the passage 52 and outlet orifice 44 to the die while the upper and lower streams of PVC are supplied by the extruders 13 and 14 and are delivered by the outlet orifices 45 and 46 to the die so that as the streams are spread and flattened in the die, uniform layers are formed above and below the foam layer, encasing the latter and providing sidings and panels with thin uniform outer layers and a lightweight inner core.

FIGS. 3 and 4 also show that the inlet orifices 41–43 are disposed symmetrically with respect to a symmetry plane 70 along the axis 16 which corresponds to a symmetry plane of the outlet orifices (FIG. 4) and that the ends of the outlet orifices 45 and 46 reach substantially to a transverse plane 71 perpendicular to the symmetry plane 70.

We claim:

1. An apparatus for extruding a continuous generally flat extrusion having three layers of synthetic resin material, comprising:

a flow block having a main axis and a pair of axial ends, said flow block being formed with a main-flow inlet at one of said axial ends, a main-flow outlet axially aligned with said main-flow inlet at the other of said axial ends, a pair of lateral inlets disposed on opposite sides of a median plane along said main axis and having respective inlet axes including angles between about 45° and about 85° with said plane and vertices tapering in a direction toward said other end, a pair of additional outlets at said other axial end having outlet axes parallel to said main axis and flanking said main-flow outlet, a substantially rectilinear main-flow passage extending along said main-flow axis and connecting said main-flow inlet with said main-flow outlet, and respective additional passages interconnecting each of said lateral inlets with a respective one of said additional outlets and substantially continuously curved therebetween;

respective adapters connecting each of said inlets to a respective extruder for delivering respective streams of thermoplastic synthetic resin to said passages and the respective outlets;

a positive displacement flow plate adjacent said other axial end of said flow block, said flow plate being formed on one side with a first planar end face provided with a circular central-inlet orifice registering with said main flow outlet and additional circular inlet orifices respectively registering with said additional outlets, said flow plate being formed on an opposite side with a second planar end face parallel to the first planar end face and provided with a central-outlet orifice of generally ovoid configuration, and with additional outlet orifices of generally elongated arcuate kidney shape extending arcuately around and straddling said central-outlet orifice, said flow plate being further formed with respective channels smoothly connecting each of said additional inlet orifices with a respective one of said additional outlet orifices and said central-inlet orifice with said central-outlet orifice; and a die having a circular inlet registering with all of said outlet orifices, a wide mouth from which a flat workpiece consisting of said streams in respective layers emerges, and a passage spreading from said circular inlet of the die to said mouth, each of said additional outlet orifices having an outer margin centered on a common circle and disposed diametrically opposite one another across said circle, said outlet orifices being symmetrical with respect to a plane of symmetry including centers of said inlet orifices and said common circle.

2. The apparatus defined in claim 1 wherein each of said additional outlet orifices has rounded ends terminating substantially at a plane through said center of said common circle and perpendicular to said plane of symmetry.

3. A positive displacement flow plate for use between a flow block having a plurality of outlets for respective streams of synthetic resin material and an extrusion die, said flow plate comprising a body formed on one side with a first planar end face provided with a circular central-inlet orifice registering with one of said outlets and additional inlet orifices respectively registering with additional ones of said outlets, said body being formed on an opposite side with a second planar end face parallel to the first planar end face and provided with a central-outlet orifice of generally ovoid configuration, and with additional outlet orifices of generally elongated arcuate kidney shape extending arcuately around and straddling said central-outlet orifice, said body being further formed with respective channels smoothly connecting each of said additional inlet orifices with a respective one of said additional outlet orifices and said central-inlet orifice with said central-outlet orifice, whereby said die can communicate with said outlet orifices, each of said additional outlet orifices having an outer margin centered on a common circle and disposed diametrically opposite one another across said circle, said outlet orifices having symmetrical with respect to a plane of symmetry including centers of said inlet orifices and said common circle.

4. A flow plate defined in claim 3 wherein each of said additional outlet orifices has rounded ends terminating substantially at a plane through said center of said common circle and perpendicular to said plane of symmetry.

5. The apparatus defined in claim 1 wherein said flow plate is sandwiched between an adapter connected with said die and said flow block.

* * * * *

UNITED STATES PATENT AND TRADEMARK OFFICE
CERTIFICATE OF CORRECTION

PATENT NO. : 4,911,628

DATED : March 27, 1990

INVENTOR(S) : Peter Heilmayr, Kenton Gearhart, Cliff Hawkes, Tom Saloom

It is certified that error appears in the above-identified patent and that said Letters Patent is hereby corrected as shown below:

On the title page, item [75], add to the list of Inventors:

--Tom Saloom, Plainsboro, New Jersey--

Signed and Sealed this

Twenty-second Day of January, 1991

Attest:

HARRY F. MANBECK, JR.

*Attesting Officer*    *Commissioner of Patents and Trademarks*